United States Patent
Tischler

(12) 
(10) Patent No.: US 6,856,817 B2
(45) Date of Patent: Feb. 15, 2005

(54) CORDLESS TELEPHONE HEADSET WITH DIALCARD DISPLAY

(75) Inventor: Ralph Tischler, Surrey (CA)

(73) Assignee: VTech Communications Ltd., Tai Po (HK)

( * ) Notice: Subject to any disclaimer, the term of this patent is extended or adjusted under 35 U.S.C. 154(b) by 492 days.

(21) Appl. No.: 10/061,529

(22) Filed: Feb. 1, 2002

(65) Prior Publication Data

US 2002/0115479 A1 Aug. 22, 2002

(30) Foreign Application Priority Data

Feb. 7, 2001 (CA) .......................................... 2334500

(51) Int. Cl.[7] .............................................. H04M 1/00
(52) U.S. Cl. .................. 455/569.1; 455/415; 455/412; 379/430; 379/431; 379/428.02; 381/312; 381/315
(58) Field of Search ............................. 455/569.1, 415, 455/575.6, 90.3, 14.9, 41.2; 379/88.21, 430, 431, 428.02; 381/312, 315, 79, 74

(56) References Cited

U.S. PATENT DOCUMENTS

| | | | | |
|---|---|---|---|---|
| 5,197,332 A | * | 3/1993 | Shennib ........................ | 73/585 |
| 5,890,074 A | * | 3/1999 | Rydbeck et al. ............ | 455/558 |
| 6,006,115 A | * | 12/1999 | Wingate .................. | 455/575.2 |
| 6,459,882 B1 | * | 10/2002 | Palermo et al. ............ | 455/41.1 |
| 6,519,448 B1 | * | 2/2003 | Dress et al. ................ | 455/41.2 |
| 6,606,506 B1 | * | 8/2003 | Jones ......................... | 455/566 |
| 6,732,381 B1 | * | 5/2004 | Lal ................................ | 2/425 |
| 2002/0068605 A1 | | 6/2002 | Stanley | |

FOREIGN PATENT DOCUMENTS

| | | | | |
|---|---|---|---|---|
| CA | 2279685 | | 2/2001 | |
| EP | 0 840 465 | | 5/1998 | |
| GB | 2 313 734 | | 12/1997 | |
| WO | 97/42743 | | 11/1997 | |
| WO | WO 03/056790 | * | 7/2003 | ........... H04M/1/60 |
| WO | WO 03/098901 | * | 11/2003 | ........... H04M/1/60 |

\* cited by examiner

*Primary Examiner*—William Trost
*Assistant Examiner*—Danh C. Le
(74) *Attorney, Agent, or Firm*—Shaw Pittman LLP

(57) ABSTRACT

A cordless telephone headset, which is controlled by an unattached handheld control module. The control module includes a keypad, and emits an infrared signal towards the user's head corresponding to the depression of a particular key on the keypad. The cordless headset is worn on a user's head, receives the infrared signals originating from the control module, and performs a function corresponding to the particular signal received, such as dialing a number or placing the telephone on hook. The control module includes a visual display screen that provides visual confirmation of keypad depressions. The control module also displays caller identification or other data for visual observation.

3 Claims, 4 Drawing Sheets

US 6,856,817 B2

CORDLESS TELEPHONE HEADSET WITH DIALCARD DISPLAY

BACKGROUND OF THE INVENTION

1. Field of the Invention

The present invention relates to telephone headsets characterized generally by a microphone and speakers connected to a headband worn by the user suspending the microphone proximate to the user's mouth and the speakers proximate to the user's ears for conducting a telephone conversation. In particular, the invention relates to an apparatus for controlling a self-contained cordless telephone headset through which the user can easily operate the cordless headset and receive visual feedback and information.

2. Background Art

Cordless telephone devices have become increasingly popular among individuals both at home and in the workplace. Cordless telephones offer the user the freedom to move about and simultaneously place or receive a telephone call without being tethered by a wire to a conventional telephone set. One disadvantage of using either a conventional telephone handset or a cordless telephone handset is the need to continually hold the handset by the hand proximate to the ear and mouth in order to conduct a telephone conversation. During extended telephone conversations, users typically develop fatigue in the hand and are limited in their ability to use their hands while speaking to, for example, take notes during a telephone call or refer to papers, materials and the like.

One prior art telephone headset design providing for a cordless communications link with a base unit locates the radio module and keypad on a headset worn by the user. While this design eliminates all cords which could otherwise become entangled, the design has the disadvantage that the user cannot see the keypad or status LED's while the telephone is being worn by the user because the keypad resides on the side of the headset, out of the user's range of vision. The telephone headset is therefore difficult to operate, and prone to user errors in dialing and control.

VTech Electronics produces a cordless headset telephone, model VT 1511, that improves upon the prior art by providing a handheld cordless dialcard. The dialcard includes a telephone keypad, and allows the user to conveniently enter a telephone number to initiate a call over the cordless headset via a unidirectional wireless communications link, specifically an infrared ("IR") transmitter. However, as a result of the proliferation of cordless and PBX telephones in recent years, many telephone users are accustomed to receiving visual feedback while operating a telephone, such as display of the numbers dialed during the dialing process. Furthermore, many telephone users take advantage of calling party identification functionality, such that they rely on being able to ascertain the nature of a call before deciding whether or not to answer it. However, in use the wearer of a cordless headset is often out of sight of the associated base unit; thus, base unit displays are not effective in presenting visual information such as caller ID data to the user. Furthermore, the headset itself is typically out of the user's field of view during use, such that any headset-mounted display cannot be used without removing the headset. Therefore, in accordance with one aspect of the invention, a display is provided to convey visual information to telephone users during operation.

These and other objects of the present invention will become apparent in light of the present specifications and drawings.

SUMMARY OF THE INVENTION

The invention provides a completely cordless telephone headset system offering a visual display and interactive control. The headset is worn on the user's head and is controlled by a portable handheld controller. The controller includes a keypad and LCD display. Information, such as caller identification data or programming menu options, are conveyed from a telephone base unit to the cordless headset via a wireless radiofrequency communications link. The information is then transmitted from the cordless headset as an infrared signal from a forward-facing IR transmitter. The IR signal is received by a detector on the handheld controller, and the conveyed information can be displayed on the controller LCD display. When the user depresses a key on the keypad while holding the controller is its intended position, such as to dial a telephone number or indicate a selected menu option, the controller emits an infrared signal upwards towards the user's head. The headset receives the infrared signal by an infrared receiver circuit, which circuit is oriented so that signals are detected from in front of and/or below the user. The headset then conveys the signal contents to a telephone base unit via the radiofrequency communications link, where the dialing of a number or selection of a menu option is completed.

DETAILED DESCRIPTION OF THE DRAWINGS

Figure 1:
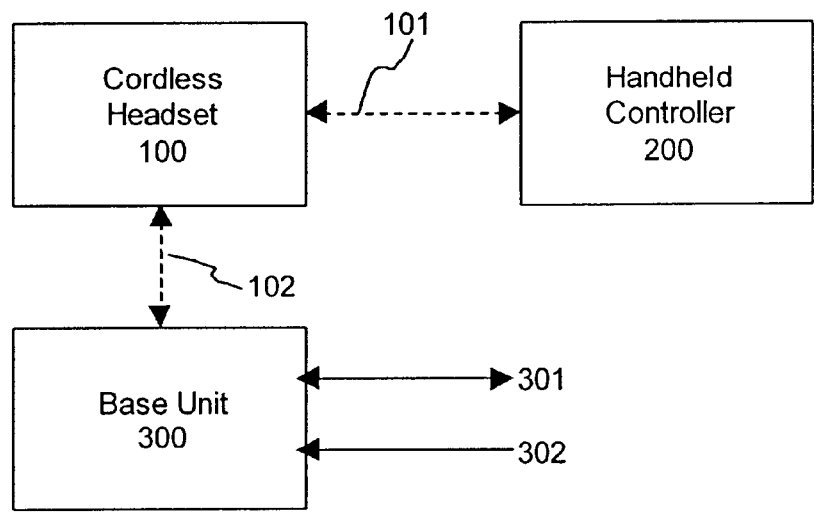
FIG. 1 of the drawings is a block diagram of the cordless headset system.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to embodiments illustrated.

FIG. 1 depicts one embodiment of the cordless telephone headset system. Cordless headset 100 communicates with base unit 300 via wireless RF link 102. Base unit 300 is comprised of a cordless telephone base unit, which base units are known in the art. Base unit 300 connects to a telephone line via connection 301 and to a source of external electrical power via line 302. Telephone functions of cordless headset 100 are controlled by handheld controller 200. Handheld controller 200 communicates with cordless headset 100 via bidirectional infrared link 101.

Figure 2:
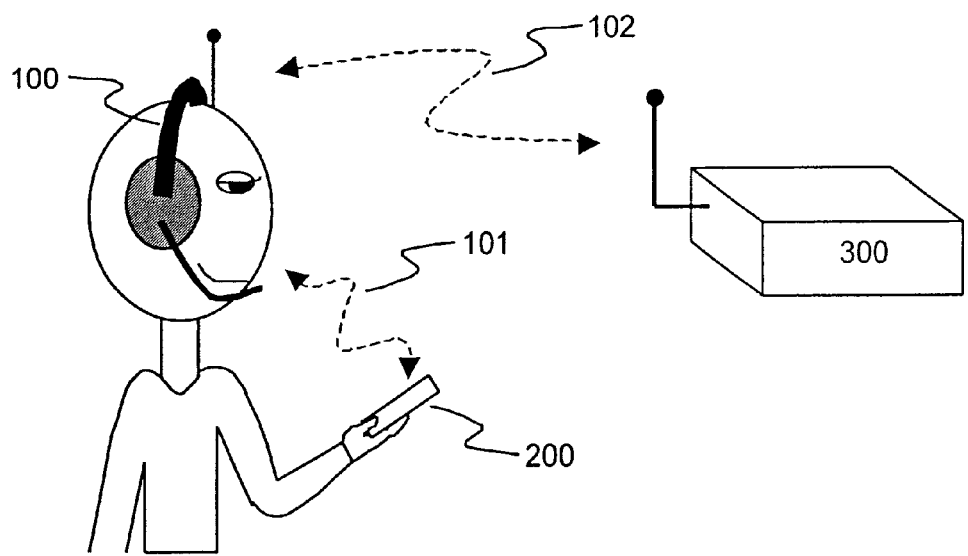
FIG. 2 of the drawings is a diagram depicting the use of the cordless headset and handheld controller by a user.
Figure 3:
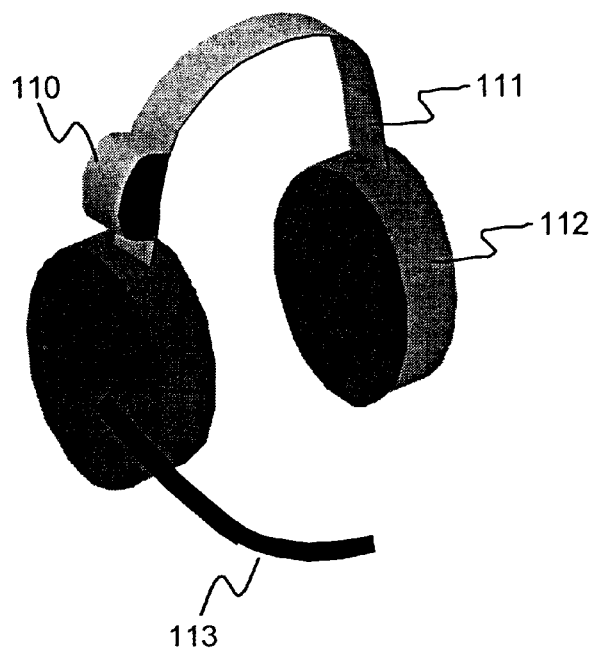
FIG. 3 of the drawings is a side angle perspective view of the cordless headset.
Figure 4:
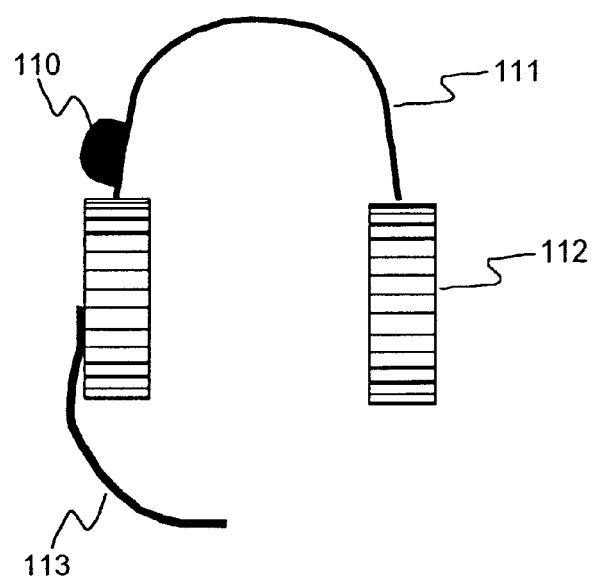
FIG. 4 of the drawings is a front view of the cordless headset.

FIG. 2 depicts a user utilizing the invention in its typical orientation. For example, when dialing a telephone number, the user wearing headset 100 holds handheld controller 200 out in front of him. As depicted in the headset embodiment of FIGS. 3 and 4, headset 100 includes two side earpiece housings 112, headband 111, boom microphone 113, and infrared transceiver 110. The radio modules and other electronics and battery are contained in one or both of ear piece housings 112. Infrared transceiver 110 is oriented in a generally forward-facing direction, such that it may transmit and receive infrared signals directed in front of and/or below the user. In the embodiment of FIGS. 3 and 4, infrared transceiver 110 is positioned along the side of band 111. However, infrared transceiver 110 can alternatively be positioned on any forward and/or downward facing position on the cordless headset without departing from the scope of the invention. For example, infrared transceiver 110 may be positioned on earpiece housing 112, at another position along band 111, or on boom microphone 113.

Figure 5:
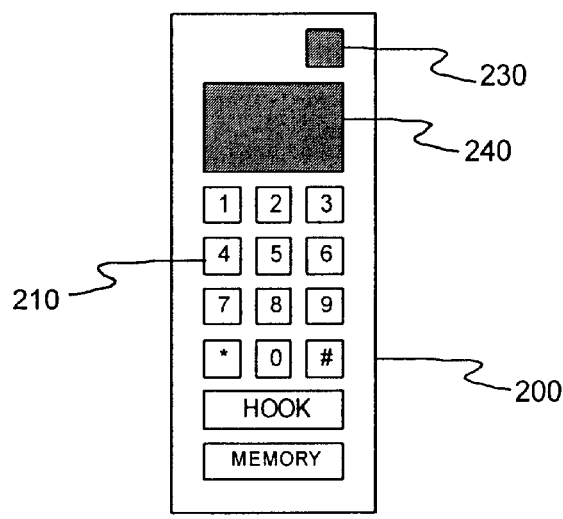
FIG. 5 of the drawings is a top view of a handheld controller.
Figure 6:
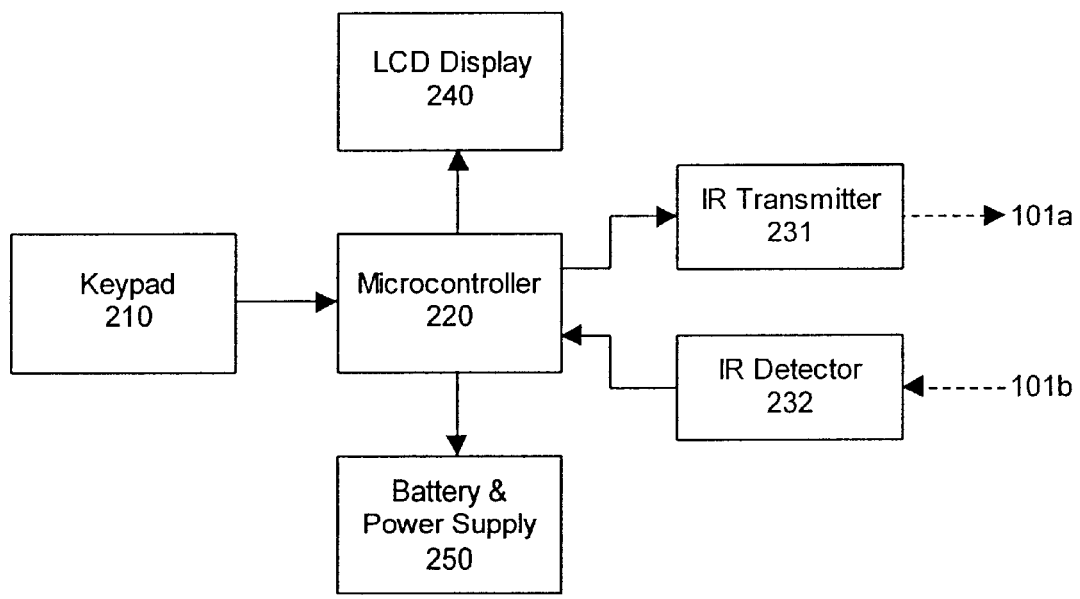
FIG. 6 of the drawings is a schematic block diagram of the handheld controller.

An external top view of handheld controller 200 is illustrated in FIG. 5. In accordance with one aspect of the invention, handheld controller 200 converts a user's desired commands into infrared signals, which are received by the cordless headset infrared transceiver 110. FIG. 6 displays a schematic block diagram of the handheld controller 200 circuit. A user depresses buttons on keypad 210. Keypad 210 may typically contain numeric dialing buttons, a hook switch button, headset volume controls, buttons for speed dial, caller ID memory recall, and/or buttons for other special functions that may be designed into the telephone. The button depressions are detected by microcontroller circuit 220, which then drives infrared transmitter 231 with a coded signal corresponding to the particular button on keypad 210 that was pressed. The coded infrared signal is then transmitted upwards towards the user's head. IR-transparent element 230 (FIG. 5) covers underlying IR transmitter 231 (FIG. 6). The configuration of handheld controller 200 and the orientation of infrared transmitter 231 on controller 200 can be varied without departing from the scope of the invention, provided that the direction of infrared transmission is towards the user's head while handheld controller 200 is in a normal usage position. Handheld controller 200 is preferably self-powered, such as by battery and power supply circuit 250.

When used for dialing a telephone number, controller 200 provides the user with a visual indication of digits dialed, such that an error can be easily detected before dialing is completed and an erroneous telephone connection is completed. Specifically, when a dialing digit on keypad 210 is actuated, microcontroller 220 receives signals from the keypad and routes an indication of the dialed digit to LCD display 240, where the digit is visually displayed to the user.

Figure 7:
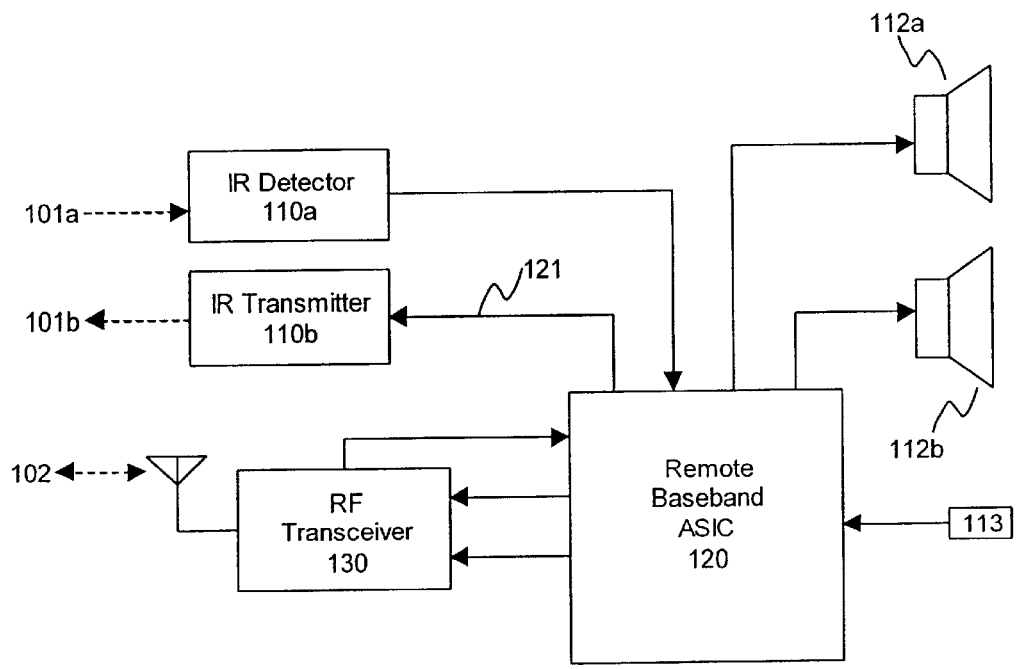
FIG. 7 of the drawings is a schematic block diagram of the cordless headset.

Infrared signals transmitted by controller 200 are detected by infrared receiver/decoder 110a on headset 100 (FIG. 7). The detected, decoded signal is passed to baseband ASIC 120. ASIC 120 can thereby act upon the remote keypad 210 button depression similarly to the way a conventional cordless telephone microcontroller would act upon depression of a button on an integrated keypad. For example, commands received from handheld controller 200 requesting a change in headset volume would cause ASIC 120 to adjust the gain of an integral headset audio amplifier which drives speakers 112a and 112b. Dialing and hookswitch commands received from handheld controller 200 may be, in turn, transmitted by headset RF transceiver 130, over wireless RF link 102, to base unit 300. Wireless communication between headset 100 and base unit 300 can take place, for example, via a digital data transmission protocol as implemented in existing cordless telephones.

Controller 200 also includes a reverse communications link with headset 100, thereby providing for bidirectional digital communications with the handheld controller. Using this link, relevant information regarding the operation of the telephone set can be visually conveyed to the user. In particular, user interface menus can be displayed on the handheld controller, allowing a cordless headset user to change telephone settings while away from the base, or navigate speed dial records. Additionally, caller identification information (Caller ID) can be displayed to the user of the cordless headset during receipt of an incoming call.

In the case of caller ID, base unit 300 receives a telephone call at line interface 320. The line signal, including modulated caller ID data, is converted to a digital signal by digitizer 330, before being conveyed to base unit baseband ASIC 310. ASIC 310 detects the received caller ID data, and encodes it for transmission to headset 200 via RF transceiver 340 and wireless communications link 102.

The encoded caller ID data is received at the headset by transceiver 130, and conveyed to ASIC 120. ASIC 120 determines that the caller ID data should be conveyed to controller 100, and subsequently sends the data on line 121 to IR transmitter 110b. Transmitter 110b encodes the data, and transmits it to the handheld controller via IR link 101b.

Handheld controller 200 receives the broadcast IR signal at IR detector 232, which subsequently decodes the data and conveys it to microcontroller 220. Microcontroller 220 recognizes that the received data is caller identification data, and conveys the identifying information to LCD display 240 for visual observation by the user. Thus, upon hearing the telephone set ring, the headset user is able to determine the identity of the calling party, even when the user is located such that the base unit is not available for viewing, and the headset itself lies outside the user's field of view.

Similarly, the above-described bidirectional data link between controller 200, cordless headset 100, and base unit 300 can be employed to provide functionality typically provided for by cordless handsets, to a fully cordless headset user, such as providing a visual user interface for programming speed dial or other functions, even while using a cordless headset product out of sight from the base unit.

Figure 8:
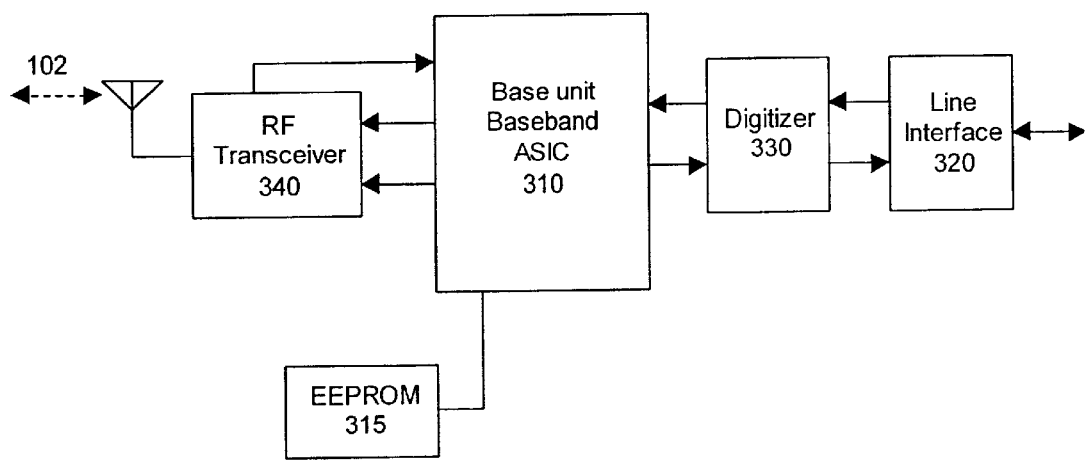
FIG. 8 of the drawings is a schematic block diagram of the base unit.

For example, the illustrated embodiment can present a user with a speed dial menu of previously programmed call recipients and their corresponding telephone numbers. Base unit ASIC 310 (FIG. 8) recalls the programmed speed dial information from EEPROM 315, and transmits the information with transceiver 340 to cordless headset 100 via RF communications link 102. The information is received by transceiver 130 (FIG. 7), and conveyed to headset ASIC 120. ASIC 120 sends the speed dial information to IR transmitter 110b, where it is conveyed to handheld controller 200 via IR communications link 101b. Handheld controller IR detector 232 receives the information, and conveys it to microcontroller 220, which displays the speed dial selection information on LCD display 240.

The user utilizes keypad 210 to navigate the displayed speed dial options, and select a desired caller. The selection is sensed by microcontroller 220, and information indicating the selection is applied to IR transmitter 231, for transmission via IR communications link 101a. The selection is received by cordless headset IR detector 110a, and conveyed to headset ASIC 120. The selection is transmitted via headset transceiver 130 and RF link 102 to base unit transceiver 340, and base unit ASIC 310. ASIC 310 then causes telephone line interface 320 to initiate a telephone call to the telephone number corresponding to the selection. In this way, analogous navigation of other options and menu systems can be implemented by a cordless headset user, even when the user is away from the base unit.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A cordless telephone that provides a visual display of a dialed telephone number to the user of a cordless telephone headset, the telephone comprising:

a cordless telephone base unit connected to a telephone service provider network;

a cordless headset, which headset communicates with the base unit via a bi-directional wireless RF communications link, and receives dialing signals via an infrared receiver;

a handheld controller comprised of a dialing keypad, an infrared transmitter that emits infrared signals corresponding to the digits dialed on the keypad, and a visual display that displays information corresponding to the numbers dialed on the dialing keypad.

2. A method for identifying a calling party to a user of a telephone set comprised of a base unit connected to a telephone network, a cordless headset, and a handheld controller with a visual display, which method comprises the steps of:

receiving caller identification data by the base unit from the telephone network;

transmitting a radiofrequency signal containing the caller identification data from the base unit to the cordless headset;

transmitting an infrared signal containing the caller identification data from the cordless headset to the handheld controller;

displaying the caller identification data on the handheld controller visual display.

3. A method for programming a telephone set comprised of a base unit, a cordless headset, and a handheld controller with a visual display, which method comprises the steps of:

transmitting a first radiofrequency signal from the base unit to the headset, containing information describing one or more programming options;

transmitting a first infrared signal containing information describing the programming options from the cordless headset to the handheld controller;

displaying information identifying the one or more options to the user on the handheld controller visual display;

selecting one of the one or more options on the handheld controller;

transmitting a second infrared signal indicating the selected option from the handheld controller to the cordless headset;

transmitting a second radiofrequency signal indicating the selected option from the cordless headset to the base unit;

whereby the base unit can operate in accordance with the selection of the selected option.

* * * * *